July 8, 1930. R. C. BALL 1,769,934
PROTECTIVE MEANS FOR SHAFT BEARINGS
Filed Oct. 1, 1926

INVENTOR.
Russell C. Ball
BY Cyrus N. Anderson
ATTORNEY.

Patented July 8, 1930

1,769,934

UNITED STATES PATENT OFFICE

RUSSELL C. BALL, OF PHILADELPHIA, PENNSYLVANIA, ASSIGNOR TO PHILADELPHIA GEAR WORKS, OF PHILADELPHIA, PENNSYLVANIA, A CORPORATION OF NEW JERSEY

PROTECTIVE MEANS FOR SHAFT BEARINGS

Application filed October 1, 1926. Serial No. 138,853.

My invention relates to means which is particularly adapted for use in the protection of bearings of shafts which are employed for supporting gears mounted within closed casings, which casings are adapted to hold masses of liquid lubricant. In constructions of this character the bearings for the supporting shafts which carry the gears are mounted or located within the casing, so that the lubricant contained within the latter has free access thereto.

It has been found in practice that a certain amount of foreign matter, such as grit, will gradually find its way into the lubricant and unless protective means is employed will find its way into the bearings and cause unnecessary and destructive wear thereof.

One of the objects of the invention is to provide means of novel construction whereby the entry of grit and other foreign matter into bearings mounted within casings containing masses or volumes of liquid lubricant is prevented.

It is also an object of the invention to provide novel means for preventing entry or access of foreign matter, such as grit, into shaft bearings mounted within casings containing volumes or masses of liquid lubricant, the said means comprising a member or element mounted on a shaft in adjacent relation to a bearing and operating to protect the latter.

A further object of the invention is to provide a screening structure of a character whereby it is adapted to be mounted upon a shaft in operative relation to its bearing for preventing access of foreign matter, such as grit, into said bearing and at the same time permitting free access of the lubricant thereto.

To these and other ends my invention comprehends a construction and arrangement of parts as hereinafter described in detail, as illustrated in the drawing forming a part of this specification and as particularly pointed out in the claims.

In the drawing I have shown one form of a convenient embodiment of the invention, but it will be understood that the invention is susceptible of embodiment in other forms of construction than that shown and that changes in the details of the construction within the scope of the claims may be made without departing from the said invention.

Figure 1:
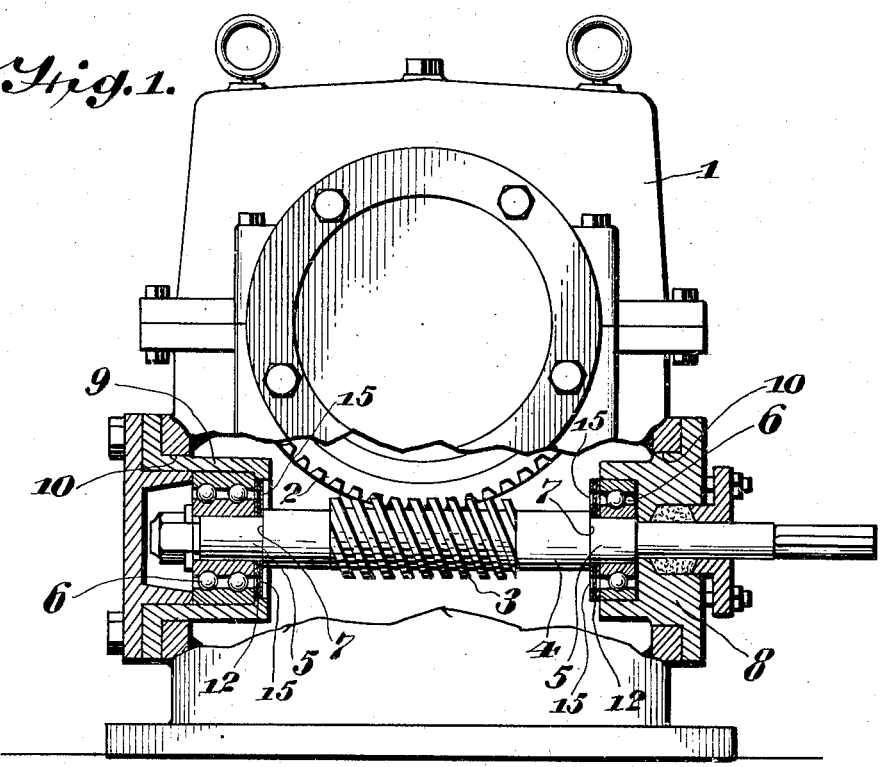
Fig. 1 is a view in elevation of a casing within which a gear unit is mounted, a portion of the said casing being broken away and the construction embodying the invention shown in section.
Figure 2:
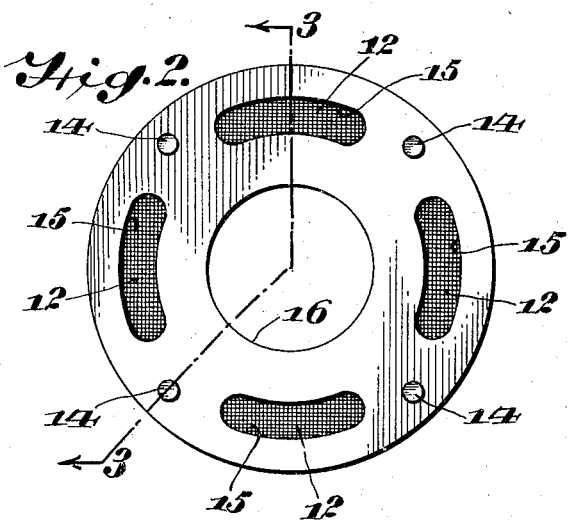
Fig. 2 is a view in side elevation of a screen structure constituting an element of the invention.

Referring to the drawing: 1 designates a casing within which gears 2 and 3 are mounted. The shaft 4 of the gear 3 only is shown for the purpose of illustrating my invention. The shaft is provided near its opposite ends with reduced portions 5, which portions are mounted or supported in and by ball-bearings 6. Shoulders 7 separate the reduced portions 5 from the intermediate main portion of the shaft 4.

The bearing structures 6 are mounted within plugs 8 and 9 which in turn are removably mounted in openings 10 in the opposite sides of the casing 1. It will be noted that the bearings are in effect located and mounted within the casing 1, so that the lubricant contained in the casing has free access thereto. The lubricant may be inserted into the casing to fill the same to a height or level such as may be desired.

Figure 3:
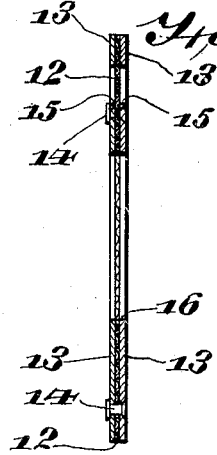
Fig. 3 is a sectional view taken on the line 3—3 of Fig. 1.

The casings of gear units of the general character illustrated may be and usually are liquid tight and this being the case it might be assumed that no grit or other foreign matter would find its way into the casing and into the lubricant therein. In practice, however, it has been found that grit and other foreign matter do find their way into the casing and that the entry thereof into the bearings causes undue and rapid wear and destruction thereof. In order to prevent this I have provided upon shafts adjacent the bearings thereof within casings a screening device to permit access of the lubricant to the bearings and at the same time prevent access of grit or other foreign matter thereto. The means employed by me consists of a screen 12 of a mesh sufficiently fine to prevent the passage therethrough of grit or other foreign matter. This screen is mounted between two parallel plates 13 of suitable metal. These plates and the screen are fastened together by rivets 14. A greater or less number of rivets may be employed as may be found to be necessary and desirable. Each of the plates 13 is provided with a number of openings 15, preferably of arc-shape, as shown. These openings are adapted to be placed in opposite relation to each other, as is indicated in Fig. 3 of the drawing. In this way only certain portions of the screen 12 are exposed. These openings constitute passageways in the structure through which the lubricant may pass.

The disks, together with the screen mounted and held between the same, are mounted upon the shaft in such relation to the shaft bearings as to prevent the entry of lubricant into the said bearings, except through the openings through the said plates and through the portions of the screen which extend across the said openings. For the purpose of mounting the plates and the screen upon a shaft they are provided with a central opening 16. In the construction as shown the plates, together with the screen held between the same, are mounted upon the inner ends of the reduced portions 5 of the the shaft and are clamped between the shoulders 7 and the bearings 6. It will be seen that the screens are in close contact with the inner exposed portions of the bearings and it is quite evident that no lubricant can have access to the bearings, except through the exposed portions of the screen within the openings 15. The mesh of the screen shrould be of a fineness sufficient to prevent the passage of grit or other foreign matter therethrough and this being the case, it will be quite evident that no grit or other foreign matter can enter the bearings 6.

The screening structure, including the plates 13 and the screen 12, may be mounted upon the shaft whose bearings are to be protected to rotate therewith or not, as may be desired.

It will be seen that by my invention I have provided means whereby the bearings of the shafts of a gear unit mounted within a casing may be completely protected against the entry of grit or other foreign matter, whereby the period of usefulness of said bearings may be greatly increased.

Having thus described my invention, what I claim and desire to secure by Letters Patent is:

1. In protective means for shaft bearings, the combination of bearings mounted within a casing adapted to contain a lubricant, a shaft journaled in said bearings, the journals of said shaft being of reduced diameter to provide a shoulder between the same and the intermediate larger portion of the said shaft, and screen structures mounted between the said shoulders and the exposed portions of the said bearings and in contact with the latter to protect the same against the entry of foreign matter thereinto with the lubricant.

2. In protective means for shaft bearings, the combination of a bearing mounted within a casing adapted to contain a liquid lubricant, and a protecting means mounted in operative relation to the exposed portion of said bearing to prevent the entry of foreign matter thereinto, the said protecting means comprising a couple of metal plates and a screen mounted between the same, the said plates and screen being riveted together, and the said plates being provided with openings in opposed relation to each other through which the lubricant is adapted to pass to the bearing.

3. In protective means for shaft bearings, the combination of bearings mounted within a casing adapted to contain a liquid lubricant, a shaft located within said casing and having reduced portions mounted in said bearings and also having shoulders at the inner ends of said reduced portions, and a screening structure mounted upon the said reduced portions between the exposed portions of the said bearings and the said shoulders and in contact with the former to prevent the entry of foreign matter thereinto, the said screening structures respectively comprising parallel metal plates with a screen mounted between the same, the said plates and screen of each structure being riveted together and the said plates of each structure having openings therethrough in opposed relation with respect to each other.

4. In protective means for shaft bearings, the combination with a bearing and a shaft having a reduced portion thereon journaled in the said bearing, said reduced portion forming a shoulder, of a screen mounted on said shaft between the said shoulder and the adjacent exposed portion of the said bearing, the said screen being interposed between the said bearing and the source of lubricant therefor.

In testimony that I claim the foregoing as my invention, I have hereunto signed my name this 29th day of September, A. D. 1926.

RUSSELL C. BALL.